UNITED STATES PATENT OFFICE.

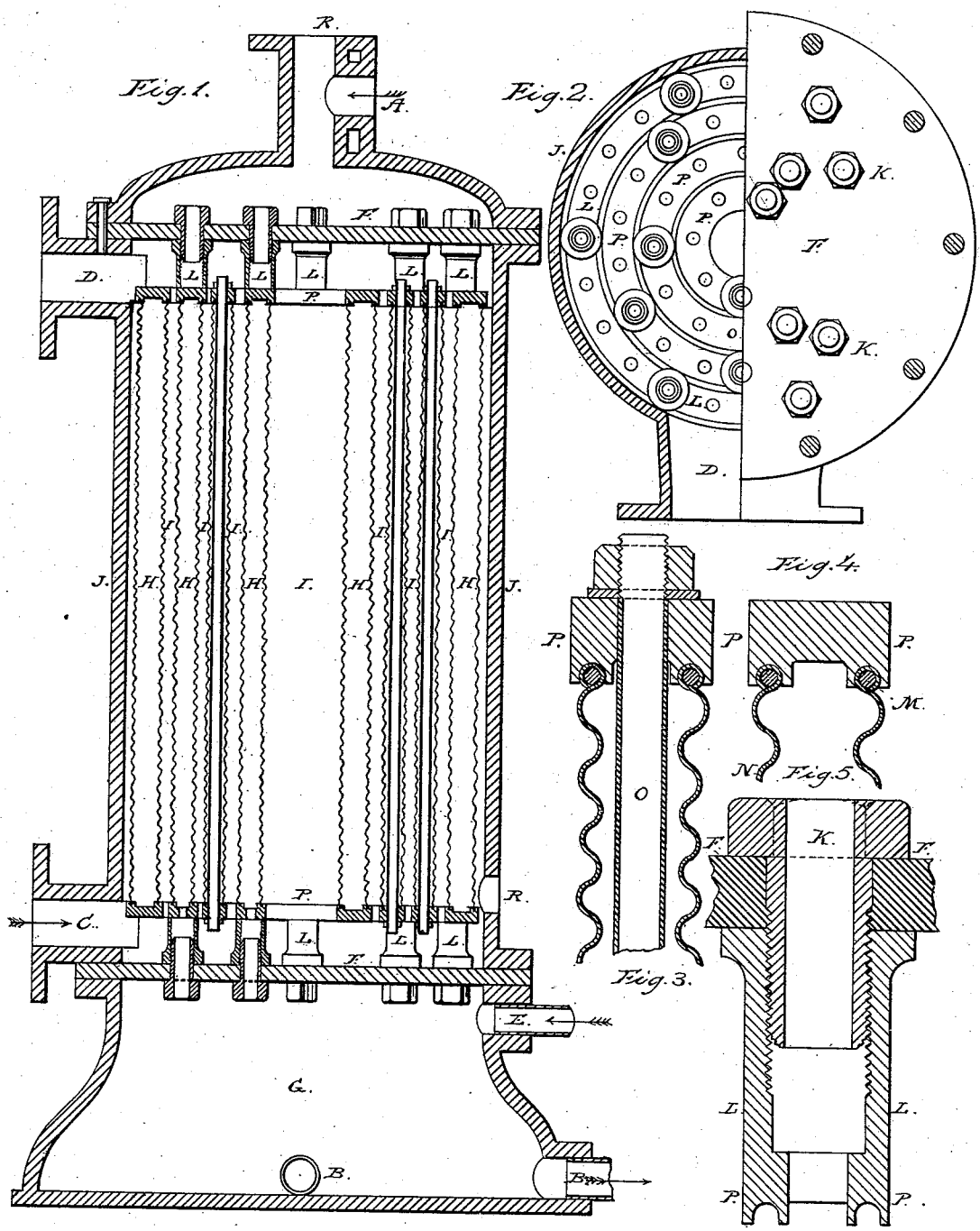

THOMAS WILLIAM DUFFY, OF LIVERPOOL, COUNTY OF LANCASTER, ENGLAND, ASSIGNOR TO ALEXANDER McDONALD BLACK FRASER, OF SAME PLACE.

HEATER OR CONDENSER.

SPECIFICATION forming part of Letters Patent No. 264,448, dated September 19, 1882.

Application filed May 16, 1882. (No model.) Patented in England January 2, 1882, No. 15, and in Belgium February 21, 1882, No. 57,132.

*To all whom it may concern:*

Be it known that I, THOMAS WILLIAM DUFFY, a subject of the Queen of Great Britain and Ireland, residing at Liverpool, in the county of Lancaster, Kingdom of Great Britain and Ireland, have invented new and useful Improvements in Heaters or Condensers, (for which I have obtained a patent in Great Britain, No. 15, bearing date January 2, 1882, and for which a patent in Belgium has been obtained by Alexander McDonald Black Fraser, No. 57,132, B, bearing date February 21, 1882,) of which the following is a specification.

This invention has for its object improvements in apparatus for transmitting heat to fluids, applicable also for condensing or cooling purposes, and has reference to an apparatus so arranged that the two fluids—viz., the one to be heated or condensed or cooled, and the one employed as the heating, condensing, or cooling medium—do not come in contact with each other, but are retained in annular chambers formed by corrugated tubes placed one inside another and abutting against end rings connected by bolts, which extend from ring to ring, passing through the annular chambers. The chambers are provided with all necessary fittings for inlet and outlet of these fluids, and for the relief of excessive pressure, and for the admission of air when required.

Referring to the accompanying sheet of drawings, Figure 1 is a vertical central section of an apparatus suitable for condensing steam produced from sea-water, for drinking and other purposes. Fig. 2 is a half transverse section of the same and a half plan; Fig. 3, a section to a larger scale, showing parts of two corrugated cylinders, an end ring, and a hollow tie-rod. Fig. 4 is a similar view without the tie-rod, and Fig. 5 is a section through an end ring and one of the tubes that afford communication between the closed annular chamber and the outer sides of the tube-plate F.

A cylindrical outer casing or shell, J, flanged at each end, is provided with all necessary fittings, including branches C and D, for inlet and outlet respectively, and also with a safety-valve. (Not shown.) Each end is closed by a tube-plate, F, the same diameter as the flanges of the shell. The upper tube-plate is covered by a dished lid provided with a steam-inlet branch, A, safety-valve, (not shown,) and other fittings. The said plate is the same diameter as the tube-plate, so that one set of bolts secures the three parts together. The lower tube-plate is held between the outer casing and a suitable base, G, which has branches B B for conducting the condensed fluid away; also an air-pipe branch, E, for inlet of air to aerate the condensed water. Within the outer shell or casing, J, corrugated tubes are arranged in such wise that between each pair an annular space, H, exists, available for the passage or circulation of one of the two above-mentioned fluids.

The relative diameters of the inner and outer tubes of a pair depend on the space required for the fluid. The corrugated tubes are shorter than the distance between the tube-plates F F to allow the fluids to pass upward or downward between the annular spaces. The tubes are corrugated in the form of a screw with a rounded thread. The ends of the tubes are slightly flanged, or are turned over rings to strengthen them where they fit into the end rings, P, Figs. 3 and 4, which close the annular openings between the ends of each pair of corrugated tubes, so as to form a joint. Each end ring has two grooves or channels cut in it to receive the ends of the corrugated cylinders, and these grooves are lined with soft metal, yarn, india-rubber, or other suitable material to form a joint. The end rings are forced down onto the cylinders by tie-bolts O, hollow or solid, extending from ring to ring. Small pipes L L afford communication between the outer sides of the tube-plate F F and the annular spaces H H between the corrugated tubes. The number of such pipes is determined by the different capacities of the annular spaces. One method of forming these pipes is shown in Fig. 5, where the pipe L is formed with and constitutes part of the end ring, P. The outer end of each pipe is immediately against the tube-plate, into contact with which it is drawn by a hollow set-screw, K, passing through the tube-plate and screwed into the pipe.

When the apparatus is used in the distillation of salt-water the steam entering at A passes through the above-mentioned small pipes into the closed annular spaces H H, where it becomes condensed by the action of the circulating water entering at C and passing through the open annular spaces I I, and falls through the lower small pipes, L L, into the base G, where it is met and mixed with air.

When desirable, I electroplate or otherwise coat the corrugated tubes or other parts of the apparatus with a suitable metal, so that no injurious chemical action shall take place.

Any number of pairs of tubes may be placed inside each other, the outside shell being sufficiently large to allow the cold water to circulate freely round. By making the tubes in the corrugated form a greater heating or cooling surface is obtained in a given space, and also sufficient strength with comparatively thin tubes. By the before-described arrangement any set of tubes may be easily withdrawn for cleaning or repairs.

For procuring a blast of fresh air a small motor of suitable construction is fixed on the steam-pipe or other convenient place, and is driven by steam, which afterward enters the condenser or cooling or heating apparatus. This motor is arranged to actuate a suitable fan, by which the air is transmitted to the base or lower chamber or other suitable part, and is there mixed with the distilled water. A filter may be added to the apparatus when required.

In some places I find it convenient to form the corrugated cylinders or casings in segments, which may be half or quarter circles or other parts of circles.

I do not lay any general claim to the use in apparatus for the purposes specified of a series of cylinders, tubes, or annular casings arranged one within another about a common center, as I am aware such arrangements have been before proposed.

What I do claim is—

1. In an apparatus for transmitting heat to fluids, applicable also for condensing or cooling, the combination of an outer casing or shell, an inlet, an outlet, upper and lower tube-plates, a series of concentric corrugated cylinders or annular casings inclosed within said casing or shell between said tube-plates, and rings that unite said concentric annular cylinders in pairs at their ends, so as to form closed annular corrugated chambers, to which communication is afforded by pipes communicating with the outside of said tube-plates, with a base provided with an air-inlet for the purpose of aerating the water of condensation, substantially as described.

2. In an apparatus for transmitting heat to fluids, applicable also for condensing or cooling, the combination of an outer casing or shell, tube-plates, concentric corrugated cylinders or annular casings, united in pairs by end rings, and pipes affording communication between the closed annular chambers inclosed by said concentric corrugated cylinders or annular casings and the outsides of said tube-plates, with a base provided with an air-inlet for the purpose of aerating the water of condensation, substantially as described.

3. In an apparatus for transmitting heat to fluids, applicable also for condensing or cooling, the combination of concentric corrugated cylinders or annular casings, grooved end rings uniting said corrugated cylinders or annular casings in pairs, and tie-bolts passing between said corrugated cylinders or annular casings from ring to ring, substantially as described.

4. In an apparatus for transmitting heat to fluids, applicable also for condensing or cooling, an end ring, P, with connecting-pipes L, constructed in one and the same piece of metal, grooved at its end and interiorly screw-threaded, in combination, the tube-plate F, and hollow set-screw K, as above described, for the purposes specified.

5. The apparatus for transmitting heat to fluids, applicable also for condensing or cooling, consisting of an outer cylindrical casing or shell provided with inlet and outlet branches, a tube-plate at each end, a hollow base with outlets and inlets, a dished cover with an inlet, a series of concentric corrugated cylinders or annular casings, united in pairs at their ends by rings to form closed annular corrugated chambers, to which communication is afforded by pipes communicating with the outsides of the tube-plates, all substantially as described and shown.

THOMAS WILLIAM DUFFY.

Witnesses:
S. W. DOD,
*Solicitor's Clerk, 3 Union Court, Liverpool.*
F. M. C. SCOTT,
*89 Victoria Street, Liverpool.*